US010282407B1

(12) United States Patent
Lee (10) Patent No.: US 10,282,407 B1
(45) Date of Patent: May 7, 2019

(54) METHOD FOR FILTERING DATA TO GENERATE A BALANCE SHEET

(71) Applicant: Gilbert F. Lee, Greenbelt, MD (US)

(72) Inventor: Gilbert F. Lee, Greenbelt, MD (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 335 days.

(21) Appl. No.: 13/972,543

(22) Filed: Aug. 21, 2013

(51) Int. Cl.
*G06F 17/00* (2019.01)
*G06F 17/24* (2006.01)

(52) U.S. Cl.
CPC .................. *G06F 17/246* (2013.01)

(58) Field of Classification Search
CPC ...................................... G06F 17/246
USPC .................. 715/212, 220, 219, 227; 705/301
See application file for complete search history.

(56) References Cited

U.S. PATENT DOCUMENTS

| | | | |
|---|---|---|---|
| 7,480,675 B2 | 1/2009 | Folting | |
| 7,546,523 B2 | 6/2009 | Aureglia et al. | |
| 7,613,719 B2 | 11/2009 | Chang | |
| 7,739,309 B2* | 6/2010 | Singh | G06Q 10/107 707/802 |
| 7,765,220 B2 | 7/2010 | Bernhardt | |
| 7,779,000 B2 | 8/2010 | Vigesaa | |
| 7,797,325 B2* | 9/2010 | So | G06F 17/30719 707/736 |
| 7,917,841 B2* | 3/2011 | Chopin et al. | 715/212 |
| 8,001,155 B2 | 8/2011 | Danton et al. | |
| 8,005,873 B2 | 8/2011 | Folting | |
| 8,095,866 B2 | 1/2012 | Folting | |
| 8,190,992 B2* | 5/2012 | Tien | G06Q 30/00 715/243 |
| 8,312,366 B2 | 11/2012 | Folting | |
| 8,396,958 B1 | 3/2013 | Hilferty | |
| 8,589,133 B1 | 11/2013 | Dalessandro | |
| 8,601,383 B2 | 12/2013 | Folting | |

(Continued)

OTHER PUBLICATIONS

Gilbert F. Lee, "An Enhanced Visual Presentation of a Balance Sheet is Generated by Data Filtering a ZRQIS0002 Report," Powerpoint slideshow presented in Dec. of 2012, 26 sheets, dated Dec. 26, 2012.

*Primary Examiner* — Stephen S Hong
*Assistant Examiner* — Matthew J Ludwig
(74) *Attorney, Agent, or Firm* — Howard Kaiser (57) ABSTRACT

According to exemplary inventive embodiments, a computer spreadsheet program (e.g., Excel) is used to devise a balance sheet template and to import a financial report. The balance sheet template is a tabular presentation having headings designating network numbers, activity numbers, and various types of financial data. Network and activity numbers are enumerated on the balance sheet template, each network number being sub-categorized into one or more activity numbers. The balance sheet template is designed for entry, in blank spaces, of the designated types of financial data corresponding to pairings of enumerated network and activity numbers. A data-filtering macro (e.g., programmed in Visual Basic for Applications) identifies in the financial report, and inserts into the balance sheet template, every item of financial data that is pertinent to both (i) a designated type of financial data and (ii) a pairing of enumerated network and activity numbers.

20 Claims, 8 Drawing Sheets

(56) References Cited

U.S. PATENT DOCUMENTS

| | | |
|---|---|---|
| 8,832,544 B2 | 9/2014 | Vigesaa |
| 8,990,675 B2 | 3/2015 | Folting |
| 9,069,748 B2 | 6/2015 | Folting |
| 9,195,728 B2 | 11/2015 | Folting |
| 9,223,772 B2 | 12/2015 | Folting |
| 2002/0013786 A1* | 1/2002 | Machalek .............. G06Q 10/10 715/209 |
| 2002/0036662 A1* | 3/2002 | Gauthier .............. G06F 17/246 715/835 |
| 2003/0188259 A1 | 10/2003 | Aureglia et al. |
| 2004/0039681 A1* | 2/2004 | Cullen et al. .................. 705/37 |
| 2004/0049730 A1* | 3/2004 | Ishizaka ................ G06F 17/246 715/213 |
| 2005/0197931 A1* | 9/2005 | Gupta ............................. 705/30 |
| 2005/0267910 A1 | 12/2005 | Anson |
| 2006/0287998 A1* | 12/2006 | Folting ............. G06F 17/30489 |
| 2007/0073635 A1 | 3/2007 | Vignet |
| 2008/0040372 A1 | 2/2008 | Bissantz |
| 2008/0288889 A1 | 11/2008 | Hunt et al. |
| 2013/0013993 A1* | 1/2013 | Oh ...................... G06F 17/5009 715/212 |
| 2014/0059412 A1 | 2/2014 | Folting |
| 2015/0007008 A1 | 1/2015 | Vigesaa |
| 2015/0193423 A1 | 7/2015 | Folting |
| 2016/0110337 A1 | 4/2016 | Folting |

\* cited by examiner

FIG. 1

| Network | Activity | Title | Planned Cost | Plan Remaining | Assigned Costs | Commitments | Obligations | Actual Costs | Budget | Available Budget |
|---|---|---|---|---|---|---|---|---|---|---|
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |

FIG. 2

| 12/25/2012 | | | | | | | | | |
|---|---|---|---|---|---|---|---|---|---|
| Network | Activity | Title | Planned Cost | Plan Remaining | Assigned Costs | Commitments | Obligations | Actual Costs | Budget | Available Budget |
| ▓▓▓▓▓ | | | | | | | | | |
| | 0010 | | | | | | | | |
| | 0020 | | | | | | | | |
| | 0030 | | | | | | | | |
| | 0039 | | | | | | | | |
| | 0017 | | | | | | | | |
| ▓▓▓▓▓ | | | | | | | | | |
| | 0010 | | | | | | | | |
| | 0011 | | | | | | | | |

FIG. 3

| Project Structure | Text | Budget | Available Budget | Planned Cost | Plan Remaining | Assigned Costs | Commit ments | Obligat ions | Actual Costs |
|---|---|---|---|---|---|---|---|---|---|
| DR-023497 | USMC PROGRAMS | 93060 | 3142.72 | 76875.64 | -13041.64 | 89917.28 | 0 | 0 | 89917.28 |
| DR-023497 \ DR-023497.01 | USMC PROGRAMS | 93060 | 3142.72 | 76875.64 | -13041.64 | 89917.28 | 0 | 0 | 89917.28 |
| DR-023497.01 \ DR-023497.0138 | BE_RDTE NSWC CD-SSES | 93060 | 3142.72 | 76875.64 | -13041.64 | 89917.28 | 0 | 0 | 89917.28 |
| DR-023497.01 \ DR-023497.0138 \ DR-023497.013802 | WB - MTVR STEERING GEAR FAILURE ANALYSIS | 93060 | 3142.72 | 76875.64 | -13041.64 | 89917.28 | 0 | 0 | 89917.28 |
| DR-023497.01 \ DR-023497.0138 \ DR-023497.013802 \ DR-023497.01380201 | MTVR STEERING GEAR FAILURE ANALY-61710 | | -89917.28 | 76875.64 | -13041.64 | 89917.28 | 0 | 0 | 89917.28 |
| DR-023497.01 \ DR-023497.0138 \ DR-023497.013802 \ 10000074299 0010 | FY12/LBR/61710/GEAR FAILURE/LEE | | -88193.8 | 62954.74 | -25239.06 | 88193.8 | 0 | 0 | 88193.8 |
| DR-023497.01 \ DR-023497.0138 \ DR-023497.013802 \ 10000074299 0020 | FY12/PRM/61710/GEAR FAILURE/LEE | 0 | 0 | 5000 | 5000 | | 0 | 0 | 0 |
| DR-023497.01 \ DR-023497.0138 \ DR-023497.013802 \ 10000074299 0030 | FY12/OTH/61710/GEAR FAILURE/LEE | 0 | -161.08 | 5000 | 4838.92 | 161.08 | 0 | 0 | 161.08 |
| DR-023497.01 \ DR-023497.0138 \ DR-023497.013802 \ 10000074299 0099 | FY12/LBR/61710/GEAR FAILURE/D_RICH | 0 | -1562.4 | 1629.91 | 67.51 | 1562.4 | 0 | 0 | 1562.4 |
| DR-023497.01 \ DR-023497.0138 \ DR-023497.013802 \ 10000074299 0617 | FY12/LBR/61710/GEAR FAILURE/LEE | 0 | 0 | 2290.99 | 2290.99 | | 0 | 0 | 0 |
| DR-023749 | TC0980 NSWCCD ONR SPRT PROJ 1 | 6082449.32 | 5984028.09 | 93746.6 | -4674.63 | 98421.23 | 0 | 0 | 98421.23 |
| DR-023749 \ DR-023749.01 | NSWCCD ONR SPRT PROJ 1 ROLL-UP | 6082449.32 | 5984028.09 | 93746.6 | -4674.63 | 98421.23 | 0 | 0 | 98421.23 |
| DR-023749.01 \ DR-023749.0101 | BE_RDTE NSWC CD | 6082449.32 | 0 | 93746.6 | -4674.63 | 98421.23 | 0 | 0 | 98421.23 |
| DR-023749.01 \ DR-023749.0101 \ DR-023749.010104 | WB - ONR FY12 ILIR PROGRAM | 0 | -98421.23 | 93746.6 | -4674.63 | 98421.23 | 0 | 0 | 98421.23 |
| DR-023749.01 \ DR-023749.0101 \ DR-023749.010104 \ DR-023749.01010402 | N0001412WX30045/AA ILIR | 0 | -98421.23 | 93746.6 | -4674.63 | 98421.23 | 0 | 0 | 98421.23 |
| DR-023749.01 \ DR-023749.0101 \ DR-023749.010104 \ DR-023749.01010402 \ 10000053931 0010 | FY12/LBR/61700/ILIR/POLYSILCOMP/$85K/BALIZER | 0 | 0 | 0 | 0 | | 0 | 0 | 0 |
| DR-023749.01 \ DR-023749.0101 \ DR-023749.010104 \ DR-023749.01010402 \ 10000053931 0011 | FY12/LBR/61700/POLYSILCOMP/$85K/BALIZER | | -97838.68 | 83946.6 | -13892.08 | 97838.68 | 0 | 0 | 97838.68 |
| DR-023749.01 \ DR-023749.0101 \ DR-023749.010104 \ DR-023749.01010402 \ 10000053931 0020 | FY12/TVL/61700/POLYSILCOMP $85K/BALIZER | | -582.55 | 5000 | 4417.45 | 582.55 | 0 | 0 | 582.55 |
| DR-023749.01 \ DR-023749.0101 \ DR-023749.010104 \ DR-023749.01010402 \ 10000053931 0030 | FY12/CCR/61700/POLYSILCOMP$85K/BALIZER | 0 | 0 | 4800 | 4800 | | 0 | 0 | 0 |

FIG. 4

| | A | B | C | D | E | F | G | H | I | J |
|---|---|---|---|---|---|---|---|---|---|---|
| Project Structure | | Text | Budget | Available Budget | Planned Cost | Plan Remaining | Assigned Costs | Commitments | Obligations | Actual Costs |
| DR-023497 | | USMC PROGRAMS | 93060 | 3142.72 | 76875.64 | -13041.64 | 89917.28 | 0 | 0 | 89917.28 |
| DR-023497 \ DR-023497.01 | | USMC PROGRAMS | 93060 | 3142.72 | 76875.64 | -13041.64 | 89917.28 | 0 | 0 | 89917.28 |
| DR-023497.01 \ DR-023497.0138 | | BE - RDTE NSWC CD-SSES | 93060 | 3142.72 | 76875.64 | -13041.64 | 89917.28 | 0 | 0 | 89917.28 |
| DR-023497.01 \ DR-023497.0138 \ DR-023497.013802 | | WB - MTVR STEERING GEAR FAILURE ANALYSIS | 93060 | 3142.72 | 76875.64 | -13041.64 | 89917.28 | 0 | 0 | 89917.28 |
| DR-023497.01 \ DR-023497.0138 \ DR-023497.013802 \ DR-023497.01380201 | | MTVR STEERING GEAR FAILURE ANALY-61710 | | -89917.28 | | | 89917.28 | | 0 | 89917.28 |
| DR-023497.01 \ DR-023497.0138 \ DR-023497.013802 \ DR-023497.01380201 \ 100000742996 0010 | | FY12/LBR/61710//GEAR FAILURE/LEE | 0 | -88193.8 | 62954.74 | -25239.06 | 88193.8 | 0 | 0 | 88193.8 |
| DR-023497.01 \ DR-023497.0138 \ DR-023497.013802 \ DR-023497.01380201 \ 100000742996 0020 | | FY12/PRM/61710//GEAR FAILURE/LEE | 0 | 0 | 5000 | 5000 | 0 | 0 | 0 | 0 |
| DR-023497.01 \ DR-023497.0138 \ DR-023497.013802 \ DR-023497.01380201 \ 100000742996 0030 | | FY12/OTH/61710//GEAR FAILURE/LEE | 0 | -161.08 | 5000 | 4838.92 | 161.08 | 0 | 0 | 161.08 |
| DR-023497.01 \ DR-023497.0138 \ DR-023497.013802 \ DR-023497.01380201 \ 100000742996 0099 | | FY12/LBR/61710//GEAR FAILURE/D. RICH | 0 | -1562.4 | 1629.91 | 67.51 | 1562.4 | 0 | 0 | 1562.4 |
| DR-023497.01 \ DR-023497.0138 \ DR-023497.013802 \ DR-023497.01380201 \ 100000742996 0617 | NWA | FY12/LBR/61710//GEAR FAILURE/LEE | 0 | 0 | 2290.99 | 2290.99 | 0 | 0 | 0 | 0 |
| DR-023749 | | ITC0980 NSWCCD ONR SPRT PROJ 1 | 6082449.32 | 5984028.09 | 93746.6 | -4674.63 | 98421.23 | 0 | 0 | 98421.23 |
| DR-023749 \ DR-023749.01 | | NSWCCD ONR SPRT PROJ 1 ROLL-UP | 6082449.32 | 5984028.09 | 93746.6 | -4674.63 | 98421.23 | 0 | 0 | 98421.23 |
| DR-023749.01 \ DR-023749.0101 | | BE - RDTE NSWC CD | 6082449.32 | 5984028.09 | 93746.6 | -4674.63 | 98421.23 | 0 | 0 | 98421.23 |
| DR-023749.01 \ DR-023749.0101 \ DR-023749.010101 | | WB - ONR FY12 ILIR PROGRAM | 0 | 0 | 93746.6 | -4674.63 | 98421.23 | 0 | 0 | 98421.23 |
| DR-023749.01 \ DR-023749.0101 \ DR-023749.010104 | | N00014 12WX30045/AA ILIR | 0 | 0 | 93746.6 | -4674.63 | 98421.23 | 0 | 0 | 98421.23 |
| DR-023749.01 \ DR-023749.0101 \ DR-023749.010104 | | FY12/LBR/61700//ILIR/POLSILCOMP85K/BALIZER | 0 | -98421.23 | 93746.6 | -4674.63 | 98421.23 | 0 | 0 | 98421.23 |
| DR-023749.01 \ DR-023749.0101 \ DR-023749.010104 \ 100000539313 0010 | | FY12/LBR/61700//POLYSILCOMP/$85K/BALIZER | 0 | -97838.68 | 83946.6 | -13892.08 | 97838.68 | 0 | 0 | 97838.68 |
| DR-023749.01 \ DR-023749.0101 \ DR-023749.010104 \ 100000539313 0011 | | FY12/TVL/61700//POLYSILCOMP $5K/BALIZER | 0 | -582.55 | 5000 | 4417.45 | 582.55 | 0 | 0 | 582.55 |
| DR-023749.01 \ DR-023749.0101 \ DR-023749.010104 \ 100000539313 0020 | | FY12/CCR/61700//POLYSILCOMP$5K/BALIZER | 0 | 0 | 4800 | 4800 | 0 | 0 | 0 | 0 |
| DR-023749.01 \ DR-023749.0101 \ DR-023749.010104 \ 100000539313 0030 | | | | | | | | | | |

FIG. 5

| 12/25/2012 | | | | | | | | | | |
|---|---|---|---|---|---|---|---|---|---|---|
| Network | Activity | Title | Planned Cost | Plan Remaining | Assigned Costs | Commitments | Obligations | Actual Costs | Budget | Available Budget |
| 100000742996 | **** | TOTAL | 76,875.64 | 2,354.88 | 74,520.76 | 0.00 | 0.00 | 74,520.76 | 93,060.00 | 18,539.24 |
| | 0010 | FY12/LBR/61710/GEAR FAILURE/LEE | 62,954.74 | -9,842.54 | 72,797.28 | 0.00 | 0.00 | 72,797.28 | 0.00 | -72,797.28 |
| | 0020 | FY12/PRW/61710/GEAR FAILURE/LEE | 5,000.00 | 5,000.00 | 0.00 | 0.00 | 0.00 | 0.00 | 0.00 | 0.00 |
| | 0030 | FY12/OTH/61710/GEAR FAILURE/LEE | 5,000.00 | 4,838.92 | 161.08 | 0.00 | 0.00 | 161.08 | 0.00 | -161.08 |
| | 0099 | FY12/LBR/61710/GEAR FAILURE/D. RICH | 1,629.91 | 67.51 | 1,562.40 | 0.00 | 0.00 | 1,562.40 | 0.00 | -1,562.40 |
| | 0617 | FY12/LBR/61710/GEAR FAILURE/LEE | 2,290.99 | 2,290.99 | 0.00 | 0.00 | 0.00 | 0.00 | 0.00 | 0.00 |
| 100000539313 | **** | TOTAL | 88,946.60 | -9,368.71 | 98,315.31 | 0.00 | 0.00 | 98,315.31 | 0.00 | -98,315.31 |
| | 0010 | FY12/LBR/61710/FILLER/POLSILCOM/85K/BALIZER | 0.00 | 0.00 | 0.00 | 0.00 | 0.00 | 0.00 | 0.00 | 0.00 |
| | 0011 | FY12/LBR/61710/POLYSILCOMP/S85K/BALIZER | 83,946.60 | -13,786.16 | 97,732.76 | 0.00 | 0.00 | 97,732.76 | 0.00 | -97,732.76 |
| | 0020 | FY12/TVL/61710//POLYSILCOMP S5K/BALIZER | 5,000.00 | 4,417.45 | 582.55 | 0.00 | 0.00 | 582.55 | 0.00 | -582.55 |
| 100000798536 | **** | TOTAL | 1,000.00 | 1,000.00 | 0.00 | 0.00 | 0.00 | 0.00 | 0.00 | 0.00 |
| | 0010 | FY13/LBR/61710/NT BEARING TEST/WONG | 0.00 | 0.00 | 0.00 | 0.00 | 0.00 | 0.00 | 0.00 | 0.00 |
| | 0020 | FY13/PRW/61710/NT BEARING TEST/WONG | 1,000.00 | 1,000.00 | 0.00 | 0.00 | 0.00 | 0.00 | 0.00 | 0.00 |
| 300000367079 | **** | TOTAL | 70,097.60 | 53,199.56 | 16,898.04 | 0.00 | 0.00 | 16,898.04 | 0.00 | -16,898.04 |
| | 0032 | OHG/LBR/61100/CORE/ARM APP/DAVE/BILL/20K | 20,072.00 | 20,072.00 | 0.00 | 0.00 | 0.00 | 0.00 | 0.00 | 0.00 |
| | 0033 | OHG/LBR/61100/CORE/ARM APP/FERRANDO/50K | 50,025.60 | 33,127.56 | 16,898.04 | 0.00 | 0.00 | 16,898.04 | 0.00 | -16,898.04 |
| | 0034 | OHG/LBR/61700/CORE/ARM APP/JAIME/GIL/25K | 0.00 | 0.00 | 0.00 | 0.00 | 0.00 | 0.00 | 0.00 | 0.00 |
| | 0036 | OHG/LBR/61700/CORE/ARM APP/MARTIN/40K | 0.00 | 0.00 | 0.00 | 0.00 | 0.00 | 0.00 | 0.00 | 0.00 |
| | 0037 | OHG/LBR/61700/CORE/ARM APP/LEE/25K | 0.00 | 0.00 | 0.00 | 0.00 | 0.00 | 0.00 | 0.00 | 0.00 |

METHOD FOR FILTERING DATA TO GENERATE A BALANCE SHEET

BACKGROUND OF THE INVENTION

The present invention relates to data analysis, more particularly to methods and systems for selectively using data from a collection of data to produce a visual presentation such as a balance sheet.

Project managers (PMs) and project business financial managers (PBFMs) render visual presentations, such as balance sheets, to keep track of the expenses and remaining funds for multiple network activities (NWAs). The rendering of a suitable visual presentation is often not a straightforward task. For instance, it may be laborious to prepare a balance sheet that displays particular information derived from a comprehensive report.

Navy Enterprise Resource Planning (ERP) is the financial system of record for the United States Department of the Navy (DON). According to current Navy practice, PMs and PBFMs run a project funding report (known as a "ZRQIS0002" report) in ERP. Navy managers print the ZRQIS0002 report, or export the report and view it in Excel. For many NWAs, the ZRQIS0002 report contains more details than needed, and the extra details tend to obscure the desired information. Many Navy managers have attempted to customize the ZRQIS0002 report in Excel by hand by inserting formulas and by cutting, copying, and pasting between two or more worksheets. Customization in this manner is usually tedious and time consuming.

SUMMARY OF THE INVENTION

In view of the foregoing, an object of the present invention is to provide an improved methodology for producing a visual presentation (e.g., a balance sheet) that contains portions of information from a more extensive source (e.g., a report).

Exemplary practice of the present invention succeeds in generating a balance sheet. A balance sheet template is provided on a first worksheet of a computer spreadsheet program, such as Excel. A financial report such as a Navy ERP ZRQIS0002 is provided on a second worksheet of the computer spreadsheet program.

According to exemplary inventive practice, the balance sheet template is characterized by a network number designation, an activity number designation, at least one financial parameter designation, plural network numbers corresponding to the network number designation, plural activity numbers corresponding to the activity number designation, and plural spaces corresponding to each financial parameter designation. The financial report is indicative of the network numbers and the activity numbers and is informative with respect to at least one financial parameter.

In accordance with exemplary practice of the present invention, the financial report is filtered. The filtering includes finding, in the financial report, correlations of the network number, the activity number, and information pertaining to at least one financial parameter. The filtering further includes extracting the correlative information from the financial report. The extracted correlative information is inserted into the spaces of the balance sheet template in accordance with the correlative network number, the correlative activity number, and the balance sheet template's financial parameter designation representing the extracted correlative information.

According to exemplary inventive practice, a macro is used for performing the filtration of the financial report and for performing the insertion of the extracted correlative information. The computer spreadsheet program can be, for instance, Excel. Two worksheets are utilized in Excel. The first Excel worksheet is a template for the user to enter the network and activity numbers. The content of the financial report is exported from a non-Excel document and is imported into the second Excel worksheet. Visual Basic for Applications (VBA) is the macro programming language of the macro used.

Conventional Navy practice requires the user to manually search, copy, and paste cost data from a financial report (e.g., a Navy ERP ZRQIS0002 report) to a balance sheet. In addition, users (e.g., of Navy ERP ZRQUIS002) must create borders and color fills by hand. Several or numerous people may be required in performing these tedious tasks.

The Navy ERP ZRQIS0002 computer program provides for a degree of adaptability to selectively abridge an original report, and calls these customized reports "variants." For instance, Navy ERP software affords a convenient procedure for entering one network number and one activity number in order to provide a concise "variant" report for a single network activity number. Under some circumstances, Navy ERP also permits selection and/or rearrangement of columns of data from among columns of data as originally presented.

Nevertheless, Navy ERP ZRQIS0002 is not as accommodative when the user desires an abridged report for plural network activity numbers. Navy ERP ZRQIS0002 can accept input of one network number and selected activity number(s) associated with that network number. However, when the user inputs more than one network number, Navy ERP ZRQUIS002 can accept input of a list of network numbers, but cannot accept inputs of selected activity numbers that are associated with each specific network number. In other words, for plural network number inputs, Navy ERP ZRQUIS002 can only generate a "variant" report that contains every network number and every activity number that is associated with each network number. Therefore, the user is often forced to accept a "variant" report containing many more network activity numbers than the user needs, and to then cull the pertinent network activity numbers and related information from the report. This unavoidable excess of network activity numbers represents a practical shortcoming of the Navy ERP ZRQIS0002.

The methodology of the present invention uses computer language, such as Microsoft's Visual Basic for Applications (VBA), to automate the entire process of taking selected information from a report and presenting the information in a balance sheet format. Exemplary embodiments of the present invention provide method and system for generating a focused and visually enhanced presentation of a balance sheet. Exemplary inventive practice includes data-filtering of a report, such as the Navy ERP's ZRQIS0002 report. The report is exported from ERP, and imported into Excel. The data-filtering macro in Excel is executed. The overall function of the data-filtering macro is to do a data filtering of the report.

The present invention computer-implemented methodology, as typically embodied, utilizes a data-filtering macro in Excel, a balance sheet template in Excel, and a report rendition in Excel. The network and activity numbers are entered into the balance sheet template, which guides the user in positioning the network and activity numbers into the correct cells of the balance sheet.

According to some inventive embodiments, the user works from an original version of a financial report to create a customized version of the financial report. The user works in the Navy ERP program to selectively copy and paste information such as network numbers from an original financial report, thereby creating a derivative financial report rendition having a customized report layout. As previously noted herein, according to the Navy ERP software terminology, this kind of customized presentation (e.g., customized report setting) is referred to as a "variant" of the original presentation. The user has the option to save, in Navy ERP ZRQIS0002, a variant that contains a list of network numbers and has a customized report layout suitable for future reports.

The present invention's data-filtering macro in Excel carries out the following tasks to produce a balance sheet for visual presentation: (i) seeks out the network activity numbers (NWA numbers) and their associated cost data and information from the report; (ii) transfers the data to the balance sheet; (iii) performs the color fill of the cells in the balance sheet; and, (iv) draws the borders of the balance sheet. The undesired details in the report are eliminated.

Terms such as "project," "network," and "activity" are conventionally understood in project management parlance, albeit with various shades of meaning. Each of these terms is used herein in its broadest sense consistent with conventional usage. The term "activity" as used herein broadly refers to any element or component of work that is performed in or during or pursuant to a project. In conventional usage, the term "activity" is sometimes used synonymously with the term "task," or is sometimes described as composed of plural tasks or subtasks, and typically connotes expectations in time, costs, and resource requirements. The term "network" is broadly used herein as any categorization according to which plural activities are related, connected, or associated with one another. The term "project" is intended herein to broadly convey any effort (e.g., business undertaking) to accomplish a goal or objective; typically, the duration, funding, and available resources pertaining to or involved in a project are pre-established.

The present invention can be embodied as a method, an apparatus, a computer program product, etc. An important feature of the present invention is the identification, by the data-filtering macro, of every desired coincidence (conjunction) of a network number and an activity number. The data-filtering macro seeks out occurrences of desired combinations of network numbers and activity numbers, and copies the respective financial data (e.g., costs data) to the balance sheet. According to some inventive embodiments, the data-filtering macro also performs a color fill of the cells, and draws the border lines, to generate an enhanced visual presentation of the data.

The present inventor made a prototype of his data-filtering macro that is capable of operating on more than 32,700 NWAs. The data-filtering macro is an automation that reduces the time in generating an organized and visually enhanced presentation of a balance sheet. It is envisioned that the balance sheet can be updated, on a periodic basis (e.g., weekly), by retrieving new cost data from a report (e.g., a ZRQIS0002 report) and executing the inventive data-filtering macro.

BRIEF DESCRIPTION OF THE DRAWINGS

The present invention will now be described, by way of example, with reference to the accompanying drawings, wherein:

FIG. 4 is a screenshot example of an Excel worksheet containing a Navy ERP ZRQIS0002 report, in accordance with the present invention.

FIG. 5 is the Navy ERP ZRQIS0002 report depicted in FIG. 4, whereon the network activity (NWA) numbers are encircled for accentuation.

BRIEF DESCRIPTION OF THE COMPUTER PROGRAM LISTING APPENDIX

Appended hereto, included in the instant disclosure, and incorporated herein by reference is a Computer Program Listing Appendix, which sets forth an embodiment of computer source code of a macro in accordance with the present invention. This Computer Program Listing Appendix is contained as a text document that was created on 9 Aug. 2013. The data file is entitled "102,340_Gilbert_F_Lee_computer_program_listing_appendix.txt," is in ASCII file format, and is approximately 19 KB.

DESCRIPTION OF EXEMPLARY EMBODIMENTS OF THE INVENTION

Referring to the figures and the appended text file, an inventive embodiment that was recently introduced by the present inventor to some Navy offices generates the desired balance sheet by utilizing a Visual Basic for Application (VBA) macro in Microsoft Excel. Microsoft Excel is a spreadsheet application that is part of the Microsoft Office suite. Excel features, inter alia, data processing tools and a macro programming language known as Visual Basic for Applications (VBA).

In accordance with an inventive prototype described herein, the present inventor has created an Excel template file for Navy use with respect to a Navy ERP ZRQIS0002 report. In December of 2012 the present inventor instructed a group of Navy employees; his instruction included presentation of his PowerPoint slideshow, hereby incorporated herein by reference, entitled "An Enhanced Visual Presentation of a Balance Sheet is Generated by Data Filtering a ZRQIS0002 Report," 26 slides, dated 26 Dec. 2012.

According to this inventive example of computer software, the template sets forth the titles for the network numbers, activity numbers, and financial parameters; that is, the starting Excel template is provided by the computer program with the columnar headers already set forth. The user fills in actual network and activity numbers of interest in the appropriate spaces, thus allowing for insertion, via an inventive data-filtering macro, of the financial information corresponding to these network activity numbers. Inventive practice can vary in terms of amounts and types of information that are pre-written on the starting template. For instance, inventive practice is possible whereby a starting template includes headers only; or, includes not only headers but also network activity numbers; or, is completely blank. Generally speaking, a typical Microsoft Excel document (file) displays one or more tabbed worksheets, with the number of tabbed worksheets at the option of the Excel user. For instance, if the Excel document displays three tabbed worksheets, then Excel labels these worksheets as "Sheet1," "Sheet2," and "Sheet3," respectively. According to exemplary practice of the present invention, a template for a balance sheet is established on a first Excel worksheet, and a financial report is replicated or reproduced on a second Excel worksheet.

According to the inventive prototype instituted by the present inventor for Navy use, an Excel template file is pre-filled with headers for network numbers, activity numbers, and financial parameters. The user opens the Excel template file and enters the network and activity numbers of interest to the user in specific locations in the first Excel worksheet (in Excel parlance, "Sheet1") for processing by the data-filtering macro. The Navy ERP ZRQIS0002 report data are imported into the second Excel worksheet ("Sheet2"). No other worksheet is used in the Excel document for this inventive application.

The balance sheet template is arranged in at least three columns, each column having a columnar heading provided therefor. A first column pertains to network number and has blank spaces for insertion of network numbers beneath the Network number heading. A second column pertains to activity number and has blank spaces for insertion of activity numbers beneath the Activity number heading. Each network number encompasses at least one activity number; that is, the activity numbers are subcategories of the network numbers.

In addition to the network number column and the activity number column, at least one column pertaining to a financial parameter is provided on the balance sheet template. Each financial parameter column pertains to a different financial parameter and has blank spaces for insertion of financial information beneath the financial parameter heading. According to exemplary inventive practice, each financial parameter is one of the following financial parameters: Planned Cost; Plan Remaining; Assigned Costs; Commitments; Obligations; Actual Costs; Budget; Available Budget. The second Excel worksheet shown in FIGS. 4 and 5 has columns for all eight of these financial parameters.

A financial report is exported from a non-Excel computer document and is imported into the same Excel document on a second Excel worksheet. According to exemplary inventive practice, the data contained by the non-Excel rendition of the report is identical or equivalent or comparable to the data contained in the Excel rendition of the report (i.e., on the second Excel worksheet).

As discussed hereinabove, according to some inventive embodiments, a "variant" (a customized version that can be created in accordance with Navy ERP software) is created in the same or a different non-Excel document, prior to exportation to the user's computer and importation into the second Excel worksheet. In a sense, the customization of the original report represents a kind of preliminary data filtration, that is, a filtering phase preceding the filtration of data that is performed by the present invention's data-filtering macro with respect to the first and second Excel worksheets. The Navy ERP "variant" may serve, for instance, to facilitate execution of an inventive data-filtering macro, or to specify modes of presentation of financial data on the first Excel worksheet.

The NWA numbers illustrated in FIGS. 4 and 5 are 16-digit numbers, viz., a 12-digit network number and a 4-digit activity number, separated therebetween by a space. Each NWA number is a numerical merger of a network number and an activity number. This is report format of the Navy ERP ZRQIS0002 along with header details which can impede the user to readily identify the NWA. The placement of the network number and the activity number in different column locations as illustrated in the first worksheet of Excel is better for quick identification of the numbers than in the second worksheet of Excel.

Digital filtering of the second Excel worksheet is performed by the macro whereby pairings of network numbers and activity numbers that are indicated on the first worksheet are identified as network activity (NWA) numbers on the second worksheet. The NWA numbers are searched for and found on the second worksheet, and corresponding financial data is extracted from the second Excel worksheet and inserted into the first Excel worksheet. The extracted and inserted financial data are data that fit in the financial parameters provided for on the balance sheet.

Application of the data-filtering macro to the first and second Excel worksheets thus brings about insertion of financial information deriving from the second Excel worksheet into blank spaces of the first Excel worksheet. The data-filtering macro finds every coincidence on the second Excel worksheet of a Network number and an Activity number that matches a coincidence of a Network number and an Activity number on the first Excel worksheet.

The data-filtering macro is executed by the user to generate the balance sheet in the first Excel worksheet (Sheet1). The macro does the following: (i) combines the Network and Activity numbers from the balance sheet (Sheet1) to generate the Network Activity number (NWA); (ii) searches and finds (digital filtering) a matching NWA in the Navy ERP ZRQIS0002 report contained in the second Excel worksheet (Sheet2); (iii) if a matching NWA is found, uses the column heading(s) denoting the financial data on the first worksheet (Sheet1) to search and find the matching column heading(s) in the second worksheet (Sheet2); (iv) for each matching column heading of a matching NWA, copies and pastes the corresponding financial data from the Navy ERP ZRQIS0002 report (Sheet2) to the balance sheet (Sheet1); (v) repeats this process until all the NWAs are found. The user saves the balance sheet with an appropriate name that reflects the data processed.

Figure 1:
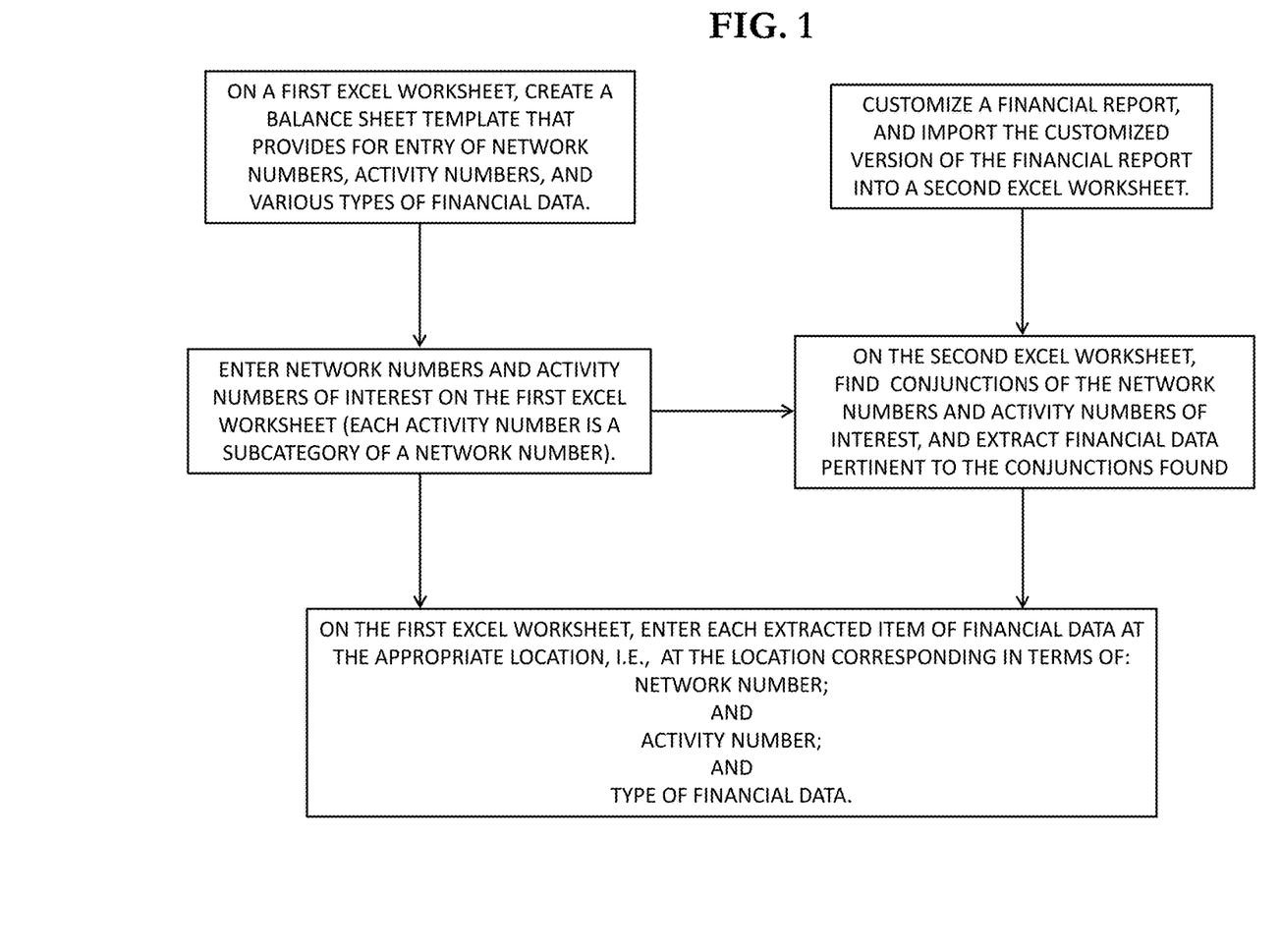
FIG. 1 is an exemplary overview of practice in accordance with the present invention.
Figure 2:
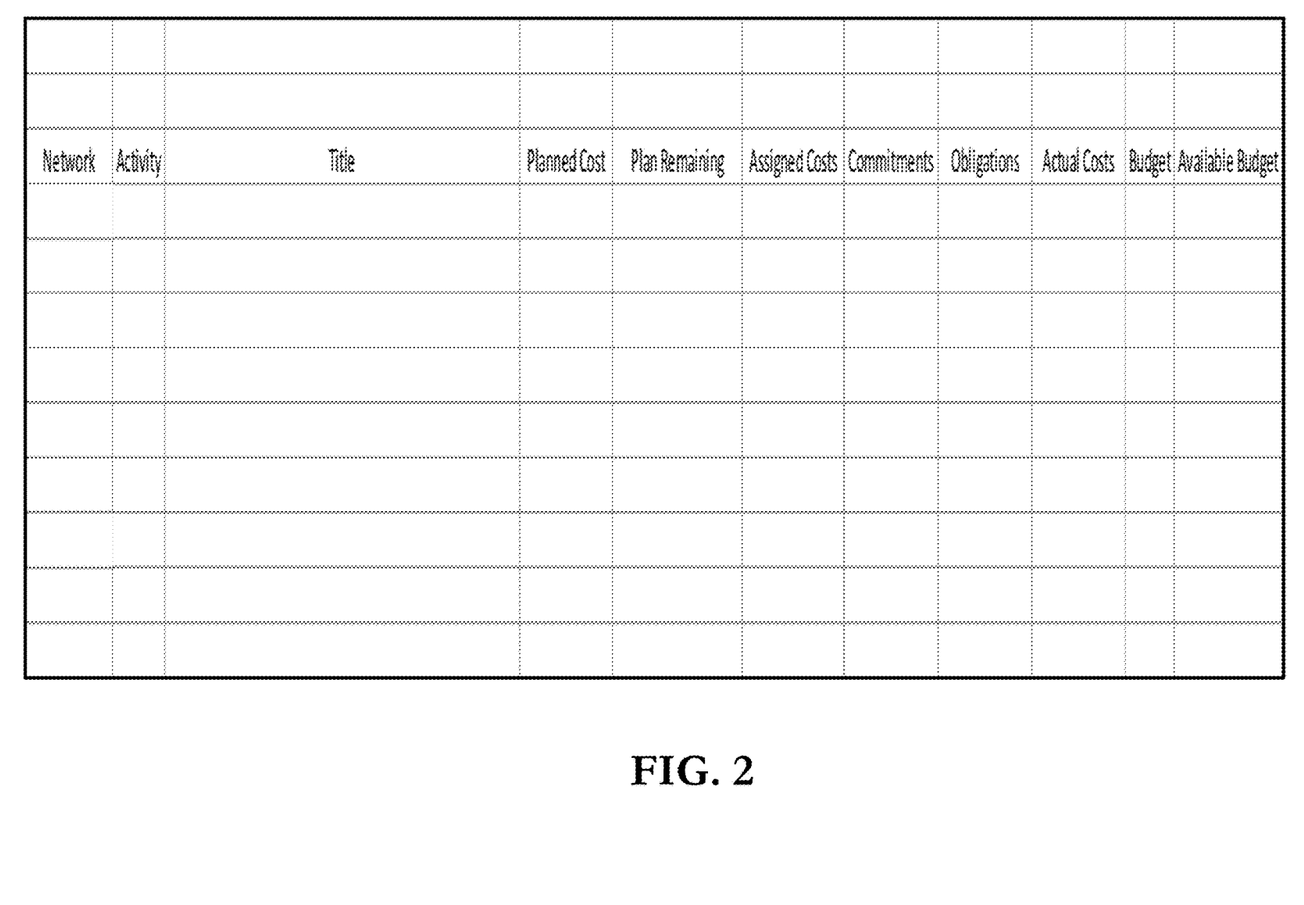
FIG. 2 is a screenshot example of an Excel worksheet containing a template of a balance sheet, in accordance with the present invention. The column heading titles are arranged with designations for the Network (i.e., network number), the Activity (i.e., the activity number), and eight types of financial data (viz., Planned Cost, Plan Remaining, Assigned Costs, Commitments, Obligations, Actual Costs, Budget, and Available Budget). As depicted in FIG. 2, the template is otherwise blank.
Figure 3:
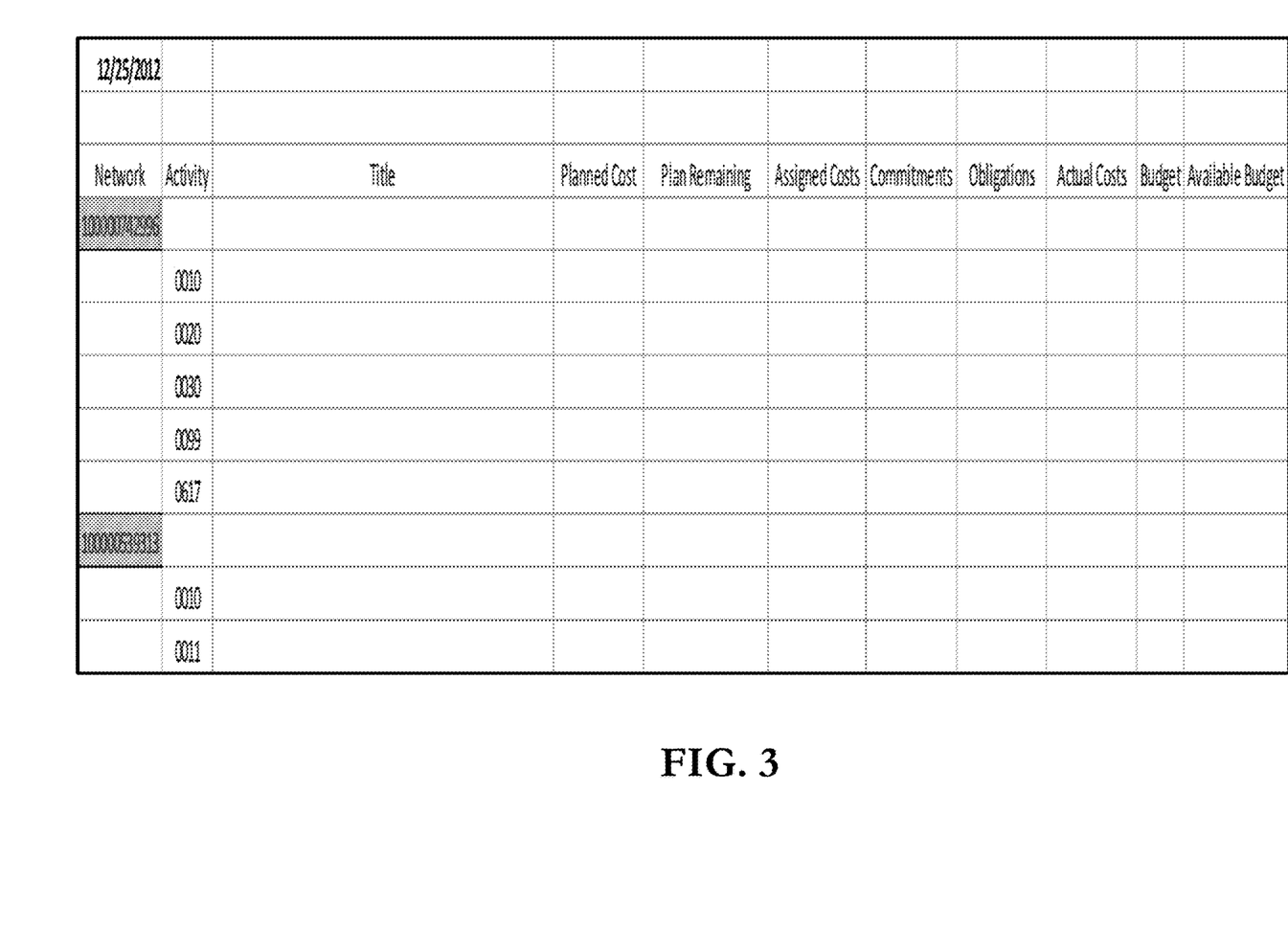
FIG. 3 is the balance sheet template depicted in FIG. 2, wherein network numbers and activity numbers are shown to be entered in the Network and Activity columns.

As depicted in FIGS. 2 and 3, there are eight possible column choices on the Excel balance sheet template, viz., Planned Cost, Plan Remaining, Assigned Costs, Commitments, Obligations, Actual Costs, Budget, and Available Budget. One, some, or all of the columnar categories can be used, and they can be organized in any desired order. The columnar titles in the balance sheet template (i.e., the first Excel worksheet) are pre-filled such as shown in FIG. 2.

In this example of inventive practice, the following file is opened in Excel: BalanceSheetForNWAs_Template.xltx. The Excel template shown in FIGS. 2 and 3 is a guide for the user to create the balance sheet. The network and activity numbers are entered by hand, and/or are copied-and-pasted from another source. The user enters (fills in) the network numbers and activity numbers in the Excel template (such as illustrated in FIG. 3) and imports the ZRQIS002 report (such as illustrated in FIGS. 4 and 5), and then runs the data-filtering macro. For instance, filling-in of the template is followed by importation of the report, which is followed by running of the macro.

The ZRQIS0002 report is exported from ERP and is imported into an Excel worksheet as external data, as exemplified by the second Excel worksheet depicted in FIGS. 4 and 5. Importation of the report into the worksheet and data-filtering by the macro can be performed on an iterative basis whereby each iteration reflects an update of the report data. For instance, the data-filtering macro can be repeatedly run each week so as to (i) replace the old report data in the worksheet with the new report data, and (ii) refresh the balance sheet.

The number referred to herein as the "Network Activity" number and abbreviated herein "NWA" represents a combination of a network number and an activity number. Nine NWA numbers are encircled for emphasis in FIG. 5. For instance, the NWA number "100000742996 0617" designates network number "100000742996" immediately followed by activity number "0617."

Figure 6:
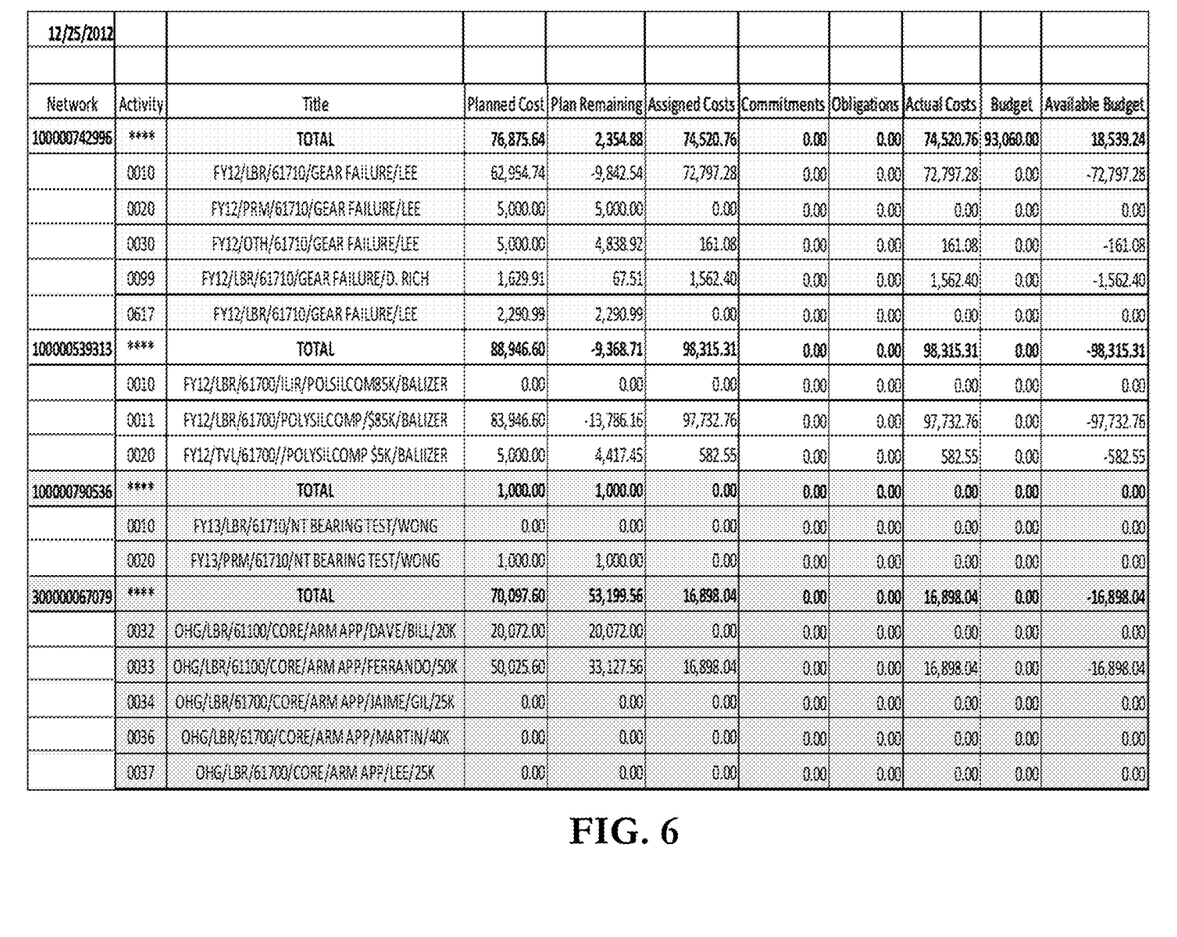
FIG. 6 is a screenshot example of a balance sheet in Excel that is generated in accordance with the present invention. The Excel balance sheet depicted in FIG. 6 implements an extended version of the Excel template depicted in FIG. 2 and FIG. 3.

For each NWA listed in the balance sheet (FIGS. 2 and 3), the data-filtering macro reads the NWA from the balance sheet and finds the matching NWA set forth in column A of the ZRQIS0002 worksheet (FIGS. 4 and 5). The selected data (e.g., Title/Text and Costs) from the ZRQIS0002 worksheet are copied to the balance sheet. FIG. 6 is an example of a completed balance sheet, that is, with all of the pertinent report data filled into the balance sheet template. According to some inventive embodiments, tabular embellishments such as bordering and color contrasting (e.g., using different colors for different network numbers) are built into the macro capability in order to yield a more readily comprehensible balance sheet such as exemplified by FIG. 6.

Figure 7:
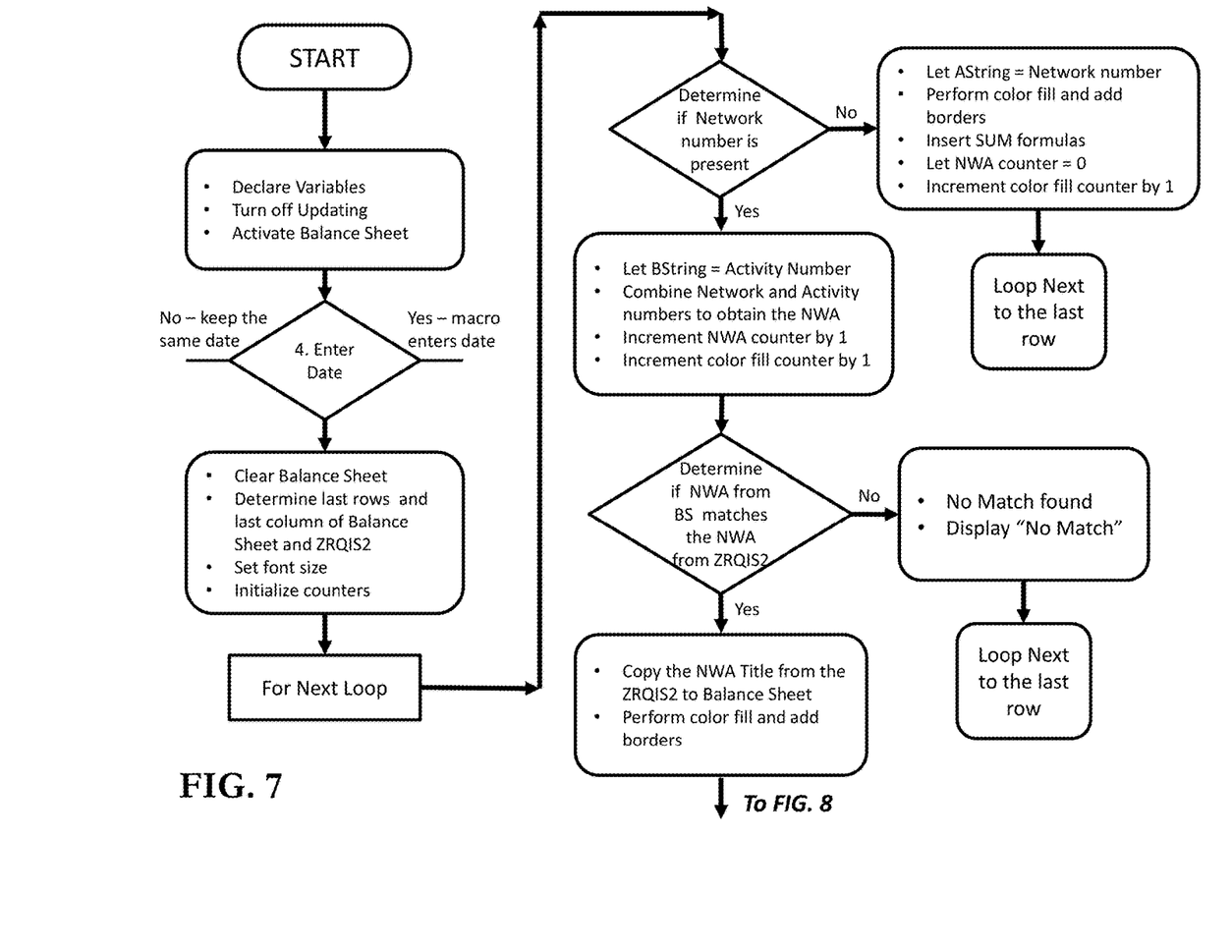
FIG. 7 and FIG. 8 together constitute a flow diagram illustrating an example, in accordance with the present invention, of generation of an enhanced visual presentation of a balance sheet. The inventive generation of a balance sheet includes data filtering of a financial report. In this example, the financial report is a Navy ERP ZRQIS0002 report.
Figure 8:
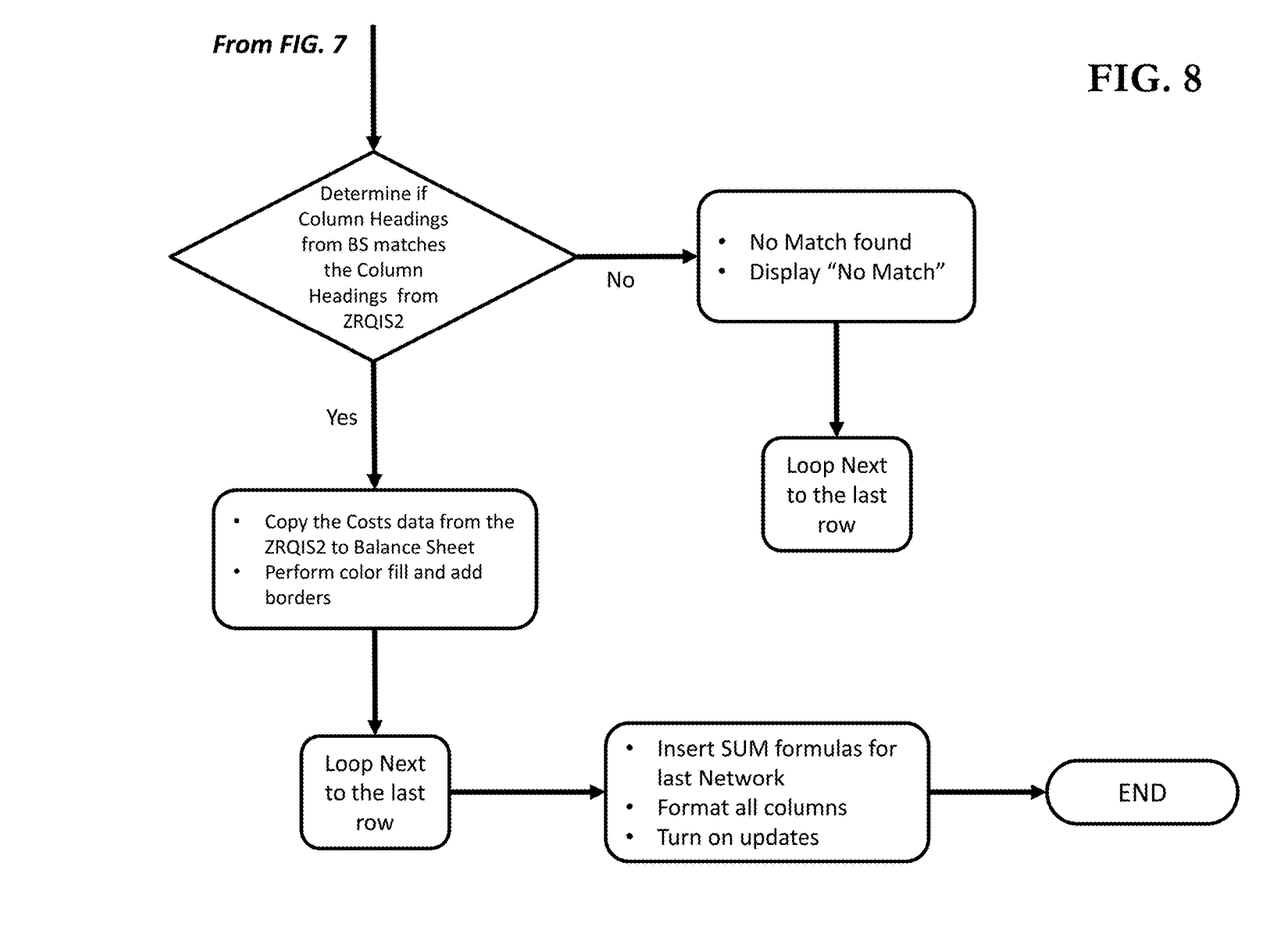

Reference is now made to the flow chart shown in FIGS. 7 and 8. In the initial phase of this inventive example, all variables are declared. The displaying of the calculations and the updating of the screen are turned off, in order to speed up the macro. The worksheet is activated ("Balance Sheet"). The user enters "Yes" to designate today's date; i.e., the macro enters the current day. The user enters "No" to not change the date; i.e., the macro does nothing in this regard, thus leaving the previous date on the balance sheet.

The balance sheet is cleared of data from the previous week by erasing all financial data, borderlines, and color fill, except for the network numbers, activity numbers, and date. The first row is set for "Balance Sheet" worksheet as 4 for row 4 and for ZRQIS0002 worksheet (ERP ZRQIS0002 report) as 1. The last rows that contain data for the balance sheet and ZRQIS0002 are determined. The last columns that contain data for the Balance sheet and ZRQIS0002 are determined. The font size is set for the Network Activity (NWA) Table. The smallest font is used for a balance sheet with eight column headings, font increases as the number of costs columns decreases. The counters are initialized, viz., the counter for the number of NWA ($kj=0$) and the color fill counter ($ci=0$).

The "For Next" loop is started. The user starts the loop with index "j" equal to the first row ($j=4$), and ends the loop with the last row of the balance sheet. A "Yes"-or-"No") determination is made as to whether a network number is present in row "j", column A. The Network number is a twelve-digit number, e.g., "100000345678."

If the answer is "Yes" as to the cell having a Network number, then the Network number is read into variable AString at row "j". Color fill is performed, and the borders are added to this cell. The SUM Formulas are inserted for each Costs column. The number of Activities found for each Network is represented by the counter kj. The SUM Formulas are developed knowing kj. The NWA counter kj is reset to zero, i.e., set equal to zero for the next Network number. The color fill count is incremented by 1.

If the answer is "No" as to the cell having a Network number (i.e., the Cell has no Network number), then an Activity number (e.g., 0010) must be in row "j", Column B. The Activity number is read into the variable BString. The Network and Activity numbers are combined as Cstring. This combined number becomes the NWA: 100000345678 0010. The NWA counter kj is incremented by 1. The ZRQIS0002 worksheet is searched to find the matching NWA in column A, with "Yes" (There is a matching NWA) versus "No" (There is no matching NWA) paths on the flow diagram.

If "Yes"—i.e., the NWA on the balance sheet matches the NWA on the ZRQIS0002—then the network activity title is copied from ZRQIS0002 to the balance sheet, color fill is performed, and the borders are added to this cell. If "No"—i.e., no matching NWA is found—then the two-letter designation "NM" (No Match) is displayed in the network-activity Title of the balance sheet. Among the possible reasons for no match being found are incorrect NWA typed in the balance sheet, or incorrect NWA typed in the ERP.

The Costs column heading titles from the Balance sheet are searched and matched with the heading titles from the ZRQIS0002 worksheet, with "Yes" (A matching Costs column heading is found) versus "No" (No matching Costs column is found) alternative possibilities. If "No" (There is no matching Costs column), then the two letters "NM" (No Match) are displayed in the Costs columns of the balance sheet.

If "Yes" (There is a matching Costs column), then the Costs data is copied from the ZRQIS0002 to the balance sheet, color fill is performed, and the borders are added to these cells. Row j of the For Next loop is incremented. If j is less than the last row of the balance sheet, then the loop continues. If j is greater than the last row of the balance sheet, then the loop is ended.

The respective totals for the Costs columns are inserted as a SUM Formula for the last Network. All of the columns are formatted, and the numbers in the columns are right-justified. The numbers are displayed with two decimal places. Border lines are added, the column width is autofit to the data, and every row height is made equal to 14.4. Cell A1 is selected. Display calculations and screen updating are turned on. The macro is ended.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A computer-implemented method for generating a balance sheet, the method comprising:

on a first worksheet of a computer spreadsheet program, providing a balance sheet template, said balance sheet template characterized by a tabular format having plural template columns, wherein each of a network number heading, an activity number heading, and at least one financial parameter heading heads a said template column, and wherein each said template column is blank beneath said at least one financial parameter heading;

in said balance sheet template, entering at least one network number in said template column having said network number heading, and entering at least one activity number in said template column having said activity number heading, wherein each said activity number is entered proximate a said network number so as to convey association with said network number;

selecting a source financial report, said source financial report containing financial data;

on a second worksheet of said computer spreadsheet program, providing a customized financial report based on said source financial report, said providing of said customized financial report including customizing said source financial report so as to contain at least a portion of said financial data, said customized financial report characterized by a said tabular format having plural report columns, wherein: at least one said report column of said customized financial report contains at least one network activity number; at least one said financial parameter heading heads a said report column; each said network activity number represents a numerical pairing of a said network number and a said activity number; and each said report column that has a said financial parameter heading contains financial data corresponding to said financial parameter heading;

creating a macro using a macro programming language that is embedded in said computer spreadsheet program, wherein said macro is created entirely within said computer spreadsheet program;

identifying particular financial data in said customized financial report, said identifying of said particular financial data including: in said balance sheet template, pairing each said activity number with an associated said network number to obtain a said network activity number; in said customized financial report, with respect to each said network activity number obtained by said pairing in said balance sheet template, finding said network activity number in said customized financial report that matches said network activity number obtained by said pairing;

with respect to each said network activity number in said customized financial report that matches said network activity number obtained by said pairing in said balance sheet template, copying said financial data contained in said report column having said network activity number to which said financial data corresponds in said customized financial report, and pasting said financial data corresponding to said network activity number into said balance sheet template, wherein said financial data is pasted into said balance sheet template: correspondingly with said network activity number obtained by said pairing in said balance sheet template; and in each said template column headed by said financial parameter heading that matches said financial parameter heading containing said financial data in said customized financial report;

navigating between said first worksheet and said second worksheet, said navigating including using a first worksheet tab and a second worksheet tab, said first worksheet having associated therewith said first worksheet tab usable for accessing said first worksheet, said second worksheet having associated therewith said second worksheet tab usable for accessing said second worksheet;

wherein said macro is used for performing said identifying of said particular financial data and for performing said copying and said pasting of the identified said particular financial data.

2. The method of claim 1 wherein:
in said balance sheet template, each said activity number represents a subcategory of at least one said network number;
said customizing of said source financial report includes: extracting said financial data from said source financial report wherein the extracted said financial data pertains to at least one said network activity number and at least one said financial parameter; and producing at least one rearrangement of said financial data contained on said source financial report.

3. The method of claim 1 wherein said at least one financial parameter heading is at least one financial parameter heading selected from the group consisting of planned cost, plan remaining, assigned costs, commitments, obligations, actual costs, budget, and available budget.

4. The method of claim 1 wherein said source financial report is indicative of each said numerical pairing of a said network number and a said activity number.

5. The method of claim 1 wherein:
said computer spreadsheet program is Excel;
said first worksheet is a first Excel worksheet;
said second worksheet is a second Excel worksheet;
said providing of said customized financial report includes exporting at least some content of said source financial report from a non-Excel document and importing the exported said content into said second Excel worksheet;
said macro programming language is Visual Basic for Applications.

6. The method of claim 1 wherein said providing of said customized financial report includes exporting at least some content of said source financial report from an external document and importing the exported said content into said second worksheet.

7. The method of claim 6 wherein:
said tabular format characterizing said balance sheet template has plural template rows and plural said template columns defining plural template spaces in each said template column;
in said balance sheet template, said template column having said network number heading has at least one said template space in which a said network number is entered;
in said balance sheet template, said template column having said activity number heading has at least one said template space in which a said activity number is entered;
in said balance sheet template, at least one said template column has a said financial parameter heading having at least one said template space in which financial data is copied and pasted from said customized financial report;
said tabular format characterizing said customized financial report has plural report rows and plural said report columns defining plural report spaces in each said report column;

in said customized financial report, at least one said report column has a least one said report space containing a network activity number;

in said customized financial report, at least one said report column having a said financial parameter heading has at least one said report space containing financial data corresponding to said financial parameter heading.

8. An apparatus comprising a computer having computer code characterized by computer program logic for enabling said computer to generate a balance sheet, said computer code being executable by said computer so that, in accordance with said computer program logic, said computer performs acts including:

using a computer spreadsheet program for providing a balance sheet template on a first worksheet of said computer spreadsheet program, said balance sheet template characterized by a tabular format having plural template columns, wherein each of a network number heading, an activity number heading, and at least one financial parameter heading heads a said template column, and wherein each said template column is blank beneath said at least one financial parameter heading;

in said balance sheet template, entering at least one network number in said template column having said network number heading, and entering at least one activity number in said template column having said activity number heading, wherein each said activity number is entered proximate a said network number so as to convey association with said network number;

selecting a source financial report, said source financial report containing financial data;

using said computer spreadsheet program for providing a customized financial report on a second worksheet of said computer spreadsheet program, said customized financial report being based on said source financial report, said providing of said customized financial report including customizing said source financial report so as to contain at least a portion of said financial data, said customized financial report characterized by a said tabular format having plural report columns, wherein: at least one said report column of said customized financial report contains at least one network activity number; at least one said financial parameter heading heads a said report column; each said network activity number represents a numerical pairing of a said network number and a said activity number; and each said report column that has a said financial parameter heading contains financial data corresponding to said financial parameter heading;

navigating between said first worksheet and said second worksheet, said navigating including using a first worksheet tab and a second worksheet tab, said first worksheet having associated therewith said first worksheet tab usable for accessing said first worksheet, said second worksheet having associated therewith said second worksheet tab usable for accessing said second worksheet;

using a macro programming language for creating a macro, said macro programming language being embedded in said computer spreadsheet program, wherein said macro is created entirely within said computer spreadsheet program;

using said macro for identifying particular financial data in said customized financial report, said identifying of said particular financial data including: in said balance sheet template, pairing each said activity number with an associated said network number to obtain a said network activity number; in said customized financial report, with respect to each said network activity number obtained by said pairing in said balance sheet template, finding said network activity number in said customized financial report that matches said network activity number obtained by said pairing;

using said macro for copying the identified said particular financial data from the customized financial report and for pasting the copied identified said financial data into said balance sheet template, said copying and said pasting of the identified said particular financial data being performed with respect to each said network activity number in said customized financial report that matches said network activity number obtained by said pairing in said balance sheet template, wherein the copied identified said particular financial data is pasted into said balance sheet template correspondingly with said network activity number that is obtained by said pairing in said balance sheet template, and wherein the copied identified said particular financial data is pasted into said balance sheet template in each said template column headed by said financial parameter heading that matches said financial parameter heading containing said financial data in said customized financial report.

9. The apparatus of claim 8 wherein:

in said balance sheet template, each said activity number represents a subcategory of at least one said network number;

said customizing of said source financial report includes: extracting said financial data from said source financial report wherein the extracted said financial data pertains to at least one said network activity number and at least one said financial parameter; and effecting at least one rearrangement of said financial data contained on said source financial report.

10. The apparatus of claim 8 wherein:

said at least one financial parameter heading is at least one financial parameter heading selected from the group consisting of planned cost, plan remaining, assigned costs, commitments, obligations, actual costs, budget, and available budget.

11. The apparatus of claim 8 wherein said source financial report is indicative of each said numerical pairing of a said network number and a said activity number.

12. The apparatus of claim 8 wherein:

said computer spreadsheet program is Excel;
said first worksheet is a first Excel worksheet;
said second worksheet is a second Excel worksheet;
said providing of said customized financial report includes exporting at least some content of said source financial report from a non-Excel document and importing the exported said content into said second Excel worksheet;
said macro programming language is Visual Basic for Applications.

13. The apparatus of claim 8 wherein said providing of said customized financial report includes exporting at least some content of said source financial report from an external document and importing the exported said content into said second worksheet.

14. The apparatus of claim 13 wherein:

said tabular format characterizing said balance sheet template has plural template rows and plural said template columns defining plural template spaces in each said template column;

in said balance sheet template, said template column having said network number heading has at least one said template space in which a said network number is entered;

in said balance sheet template, said template column having said activity number heading has at least one said template space in which a said activity number is entered;

in said balance sheet template, at least one said template column has a said financial parameter heading having at least one said template space in which financial data is copied and pasted from said customized financial report;

said tabular format characterizing said customized financial report has plural report rows and plural said report columns defining plural report spaces in each said report column;

in said customized financial report, at least one said report column has a least one said report space containing a network activity number;

in said customized financial report, at least one said report column having a said financial parameter heading has at least one said report space containing financial data corresponding to said financial parameter heading.

15. A computer program product for generating a balance sheet, the computer program product comprising a non-transitory computer-readable storage medium having computer-readable program code portions stored therein for execution by a computer, the computer-readable program code portions including:

a first executable portion of the computer-readable program code, for providing a balance sheet template on a first worksheet of a computer spreadsheet program, said balance sheet template characterized by a tabular format having plural template columns, wherein each of a network number heading, an activity number heading, and at least one financial parameter heading heads a said template column, and wherein each said template column is blank beneath said at least one financial parameter heading;

a second executable portion of the computer-readable program code, for entering, in said balance sheet template, at least one network number in said template column having said network number heading, and entering at least one activity number in said template column having said activity number heading, wherein each said activity number is entered proximate a said network number so as to convey association with said network number;

a third executable portion of the computer-readable program code, for selecting a source financial report, said source financial report containing financial data;

a fourth executable portion of the computer-readable program code, for providing a customized financial report on a second worksheet of said computer spreadsheet program, said customized financial report being based on said source financial report, said providing of said customized financial report including customizing said source financial report so as to contain at least a portion of said financial data, said customized financial report characterized by a said tabular format having plural report columns, wherein: at least one said report column of said customized financial report contains at least one network activity number; at least one said financial parameter heading heads a said report column; each said network activity number heading represents a numerical pairing of a said network number and a said activity number; and each said report column that has a said financial parameter heading contains financial data corresponding to said financial parameter heading;

a fifth executable portion of the computer-readable program code, for enabling navigation between said first worksheet and said second worksheet, said navigation including use of a first worksheet tab and a second worksheet tab, said first worksheet having associated therewith said first worksheet tab usable for accessing said first worksheet, said second worksheet having associated therewith said second worksheet tab usable for accessing said second worksheet;

a sixth executable portion of the computer-readable program code, for creating a macro, said creating of said macro being performed entirely within said computer spreadsheet program using a macro programming language embedded in said computer spreadsheet program;

a seventh executable portion of the computer-readable program code, for identifying particular financial data in said customized financial report, said identifying of said particular financial data in of said financial report being performed using said macro, said identifying of said particular financial data including: in said balance sheet template, pairing each said activity number with an associated said network number to obtain a said network activity number; in said customized financial report, with respect to each said network activity number obtained by said pairing in said balance sheet template, finding said network activity number in said customized financial report that matches said network activity number obtained by said pairing;

an eighth executable portion of the computer-readable program code, for copying the identified said particular financial data from the customized financial report and for pasting the copied identified said particular financial data into said balance sheet template, said copying and said pasting of the identified said particular financial data being performed with respect to each said network activity number in said customized financial report that matches said network activity number obtained by said pairing in said balance sheet template, wherein said financial data is pasted into said balance sheet template correspondingly with said network activity number that is obtained by said pairing in said balance sheet template, and wherein said financial data is pasted into said balance sheet template in each said template column headed by said financial parameter heading that matches said financial parameter heading containing said financial data in said customized financial report.

16. The computer program product of claim 15 wherein:

in said balance sheet template, each said activity number represents a subcategory of at least one said network number;

said customizing of said source financial report includes: extracting said financial data from said source financial report wherein the extracted said financial data pertains to at least one said network activity number and at least one said financial parameter; and effecting at least one rearrangement of said financial data contained on said source financial report.

17. The computer program product of claim 15 wherein:

said at least one financial parameter heading is at least one financial parameter heading selected from the group consisting of planned cost, plan remaining, assigned costs, commitments, obligations, actual costs, budget, and available budget.

18. The computer program product of claim 15 wherein said source financial report is indicative of each said numerical pairing of said network number and a said activity number.

19. The computer program product of claim 15 wherein:
said computer spreadsheet program is Excel;
said first worksheet is a first Excel worksheet;
said second worksheet is a second Excel worksheet;
said providing of said customized financial report includes exporting at least some content of said source financial report from a non-Excel document and importing the exported said content into said second Excel worksheet;
said macro programming language is Visual Basic for Applications.

20. The computer program product of claim 15 wherein:
said providing of said customized financial report includes exporting at least some content of said source financial report from an external document and importing the exported said content into said second worksheet;
said tabular format characterizing said balance sheet template has plural template rows and plural said template columns defining plural template spaces in each said template column;
in said balance sheet template, said template column having said network number heading has at least one said template space in which a said network number is entered;
in said balance sheet template, said template column having said activity number heading has at least one said template space in which a said activity number is entered;
in said balance sheet template, at least one said template column has a said financial parameter heading having at least one said template space in which financial data is copied and pasted from said customized financial report;
said tabular format characterizing said customized financial report has plural report rows and plural said report columns defining plural report spaces in each said report column;
in said customized financial report, at least one said report column has a least one said report space containing a network activity number;
in said customized financial report, at least one said report column having a said financial parameter heading has at least one said report space containing financial data corresponding to said financial parameter heading.

* * * * *